3,236,809
POLYSULFONATE COPOLYMERS
Eugene P. Goldberg, Des Plaines, and Frank Scardiglia, Elmwood Park, Ill., assignors to Borg-Warner Corporation, Chicago, Ill., a corporation of Illinois
No Drawing. Filed Apr. 24, 1961, Ser. No. 118,480
17 Claims. (Cl. 260—49)

This invention relates to linear condensation copolymers and in particular to condensation copolymers derived from mixed diphenols and aryl disulfonic acids or disulfonyl halides.

Various polysulfonate homopolymers are known in the art. However, because the homopolymers have not demonstrated useful combinations of properties, they find almost no commercial utility in plastics applications.

We have discovered a new class of aromatic polysulfonate copolymer compositions characterized by good physical, chemical and electrical properties. These new compositions may generally be considered to have high softening temperatures and unusual chemical stability as well as desirable strength properties. Although remarkably resistant to acids, bases and oils, they are soluble in specific organic solvents, thus permitting the formation of fibers or films from solution. They may also be formed into useful parts and objects by conventional thermoplastic fabricating techniques, such as extrusion, injection or compression molding, hot spraying and fluid bed methods.

The compositions of this invention comprise aromatic polysulfonate copolymers containing structural units derived from two or more diphenols and an aromatic disulfonyl halide, the structural units occurring in various fashions in the linear copolymer chain. More specifically, the copolymers may be of a random type in which the structural units are propagated along the copolymer chain in a random manner. Another type would be random-block in which the structural units are randomly arranged in the linear chain but in which one of the unit structures is itself polymeric. Such structures may be achieved, for example, by the formation of an aryl polysulfonate using a single diphenol followed by addition of a second diphenol and further polycondensation. Additional structural modifications would include block types in which both structural units are polymeric, block-block. It is apparent that block structures themselves are susceptible to regular or random arrangement as indicated by the method of preparation.

The compositions of the present invention comprise linear condensation copolymers prepared typically under interfacial polycondensation conditions from two or more diphenols and an aryl disulfonyl halide. Essentially any dihydric phenol is useful in the practice of this invention. The diphenols may be generally represented by Formula I:

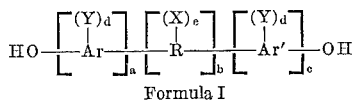

Formula I where R is an alkylene linkage, e.g., methylene, ethylene, propylene, isopropylene, butylene, isobutylene, amylene, etc.; or a linkage selected from the group consisting of ether, carbonyl, amino or a sulfur containing linkage, e.g., sulfide, sulfoxide, sulfone, or a silicon containing linkage, e.g., silane or siloxy. R can also consist of two or more alkylene linkages connected by such groups as aromatic, amino, ether, carbonyl, silane, siloxy, sulfide, sulfoxide, sulfone, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different. Y is a substituent selected from the group consisting of organic, inorganic, or organometallic radicals. The substituents represented by Y include (1) halogen, e.g., chlorine, bromine, fluorine or (2) ether groups of the general formula OE, where E is a monovalent hydrocarbon radical similar to R or (3) monovalent hydrocarbon groups of the type represented by R or (4) other substituents, e.g., nitro, cyano, etc., said substituents being essentially inert to the polymerization reaction environment.

$d$ is a whole number ranging from 0 to a maximum equivalent to the number of replaceable hydrogens substituted on the aromatic rings comprising Ar or Ar'.

$e$ is a whole number ranging from 0 to a maximum controlled by the number of replaceable hydrogens on R.

$a$, $b$, and $c$ are whole numbers including 0. When $b$ is not 0, neither $a$ nor $c$ may be 0. Otherwise either $a$ or $c$, but not both, may be 0. Where $b$ is 0 in Formula I, the aromatic groups are joined by a direct bond between the aromatic carbocyclic ring carbon atoms with no connecting alkyl or other linkage. The hydroxyl and Y substituents on the aromatic groups, Ar and Ar', can be varied in the ortho, meta or para positions on the aromatic rings and the groups can be in any possible geometric relationship with respect to one another.

Examples of difunctional phenols that are useful in the practice of this invention include bisphenols of which the following are representative: 2,2-bis-(4-hydroxyphenyl)-propane (Bisphenol-A); bis-(2-hydroxyphenyl)-methane; bis-(4-hydroxyphenyl)-methane; 1,1,-bis-(4-hydroxyphenyl)-ethane; 1,2-bis-(4-hydroxyphenyl)-ethane; 1,1-bis-(2-chloro-4-hydroxyphenyl)-ethane; 1,1,-bis-(2,5-dimethyl-4-hydroxyphenyl)-ethane; 2,2-bis-(3-phenyl-4-hydroxyphenyl)-propane; 2,2-bis-(4-hydroxynaphthyl)-propane; 2,2-bis-(4-hydroxyphenyl)-pentane; 2,2-bis-(4-hydroxyphenyl)-hexane; bis-(4-hydroxyphenyl)-phenylmethane; bis-(4-hydroxyphenyl)-cyclohexylmethane; 1,2-bis-(4-hydroxyphenyl)-1,2-bis-(phenyl)-ethane; 2,2-bis-(4-hydroxyphenyl)-1-phenylpropane; bis-(4-hydroxy-5-nitrophenyl)-methane; bis-(4-hydroxy-2,6-dimethyl-3-methoxyphenyl)-methane; 2,2-bis-(2,6-dichloro-4-hydroxyphenyl)-propane; and 2,2-bis-(2-bromo-4-hydroxyphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol: dihydroxybiphenyls such as 4,4'-dihydroxybiphenyl; 2,2'-dihydroxybiphenyl; 2,4'-dihydroxybiphenyl; and dihydroxynaphthalenes such as 2,6-dihydroxynaphthalene, etc.

Dihydroxyaryl sulfones are also useful such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis-(4-hydroxyphenyl)-biphenyl disulfone, etc. The preparation of these and other useful dihydroxyarylsulfones is described in Patent 2,288,282, Huissmann. Polysulfones, as well as sufones substituted with halogen, nitro, alkyl and other substituents are also useful. In addition, related sulfides and sulfoxides are applicable.

Dihydroxyaromatic ethers are useful and may be prepared by methods found in Patent 2,739,171, Linn, and in "Chemical Reviews," 38, 414–417 (1946). Typical of such dihydroxyaryl ethers are the following: 4.4'-dihydroxyphenyl ether; 4,4'-dihydroxy-2,6-dimethylphenyl ether; 4,4'-dihydroxy-3,3'-diisobutylphenyl ether; 4,4'-dihydroxy-3,3'-diisopropylphenyl ether; 4,4'-dihydroxy-2,2'-dinitrophenyl ether; 4,4'-dihydroxy-3,3'-dichlorophenyl ether; 4,4'-dihydroxynaphthyl ether; 2,4'-dihydroxytetraphenyl ether; 4,4'-dihydroxytriphenyl ether; 4,4'-dihydroxy-2,6-dimethoxyphenyl ether, etc. The many other types of suitable dihydroxyaryl compounds will be apparent to those skilled in the art.

Formula I for the diphenols may also be more generally and conveniently depicted by Formula II, wherein the aromatic carbocyclic group D represents all of the Formula I molecule except the hydroxyl functions:

HO⟨D⟩OH

Formula II

Aromatic sulfonyl halides react readily with phenols or their salts to give aromatic sulfonates according to the following reaction:

$ArSO_2Cl + Ar'OX \rightarrow ArSO_2OAr' + XCl$ in which X is either hydrogen or an alkali metal and Ar and Ar' are aromatic groups. To obtain a linear high molecular weight polymer, the sulfonyl halide and the phenol reactants must be bifunctional. The reagents used in the polymerization must also be very pure and essentially free of mono- and polyfunctional materials which could promote low molecular weight or crosslinking.

The aromatic disulfonyl halides or chlorides are prepared most conveniently by direct reaction of an aromatic hydrocarbon with chlorosulfonic acid, H—Ar—H + 4ClSO₃H
→ ClO₂S—Ar—SO₂Cl + 2HCl + 2H₂SO₄ or by the disulfonation of an aromatic compound followed by treatment with a chlorinating agent such as PCl₅, PCl₃, SOCl₂ or COCl₂ which methods are well known in the art.

H—Ar—H + 2H₂SO₄ → HO₃S—Ar—SO₃H + 2H₂O

HO₃S—Ar—SO₃H + chlorinating agent
→ ClO₂S—Ar—SO₂Cl

Essentially, any aromatic disulfonyl chloride is useful in the practice of this invention and may be generally represented by Formula III:

$$ClO_2S-\left[\begin{matrix}(Y)_d\\|\\-Ar''-\end{matrix}\right]_a\left[\begin{matrix}(X)_c\\|\\-R-\end{matrix}\right]_b\left[\begin{matrix}(Y)_d\\|\\-Ar'''-\end{matrix}\right]_c-SO_2Cl$$

Formula III where Ar" and Ar'" are aromatic groups as defined before for Ar and Ar' in Formula I and where they may be the same or different with respect to one another or with respect to Ar and Ar'. Y, X, a, b, c, and d are as defined for Formula I. Formula III for the aryl disulfonyl chlorides may also be more generally and conveniently depicted by Formula IV, wherein the aromatic carbocyclic group G represents all of the Formula III molecule except the sulfonyl chloride functions:

ClO₂S⟨G⟩SO₂Cl

Formula IV

Examples of aromatic disulfonyl chlorides that are useful in the practice of this invention include benzenedisulfonyl chlorides of which the following are representative: o-, m-, and p-benzenedisulfonyl chloride; 1-chloro-2,4-benzenedisulfonyl chloride; 1-bromo-3,5-benzenedisulfonyl chloride; 1-nitro-3,5-benzenedisulfonyl chloride; 1-methyl-2,4-benzenedisulfonyl chloride; 1-methyl-4-chloro-2,6-benzenedisulfonyl chloride; 1-ethyl-2,4-benzenedisulfonyl chloride; 1,2-dimethyl-3,5-benzenedisulfonyl chloride; 1,3-dimethyl-2,4-benzenedisulfonyl chloride; 1,4-dimethyl-2,6-benzenedisulfonyl chloride; 1-methoxy-2,4-benzenedisulfonyl chloride.

Also useful are biphenyldisulfonyl chlorides of which the following are typical: 2,2'-biphenyldisulfonyl chloride; 3,3'-biphenyldisulfonyl chloride; 4,4'-biphenyldisulfonyl chloride; 4,4'-dibromo-3,3'-biphenyldisulfonyl chloride; and 4,4'-dimethyl-3,3'-diphenyldisulfonyl chloride.

Arylsulfonedisulfonyl chlorides, such as 3,3'-phenylsulfonedisulfonyl chloride, are useful as are diarylalkane compounds typified by 4,4'-diphenylmethanedisulfonyl chloride; 2,2-bis-(4-phenylsulfonyl chloride)-propane; etc.

Aryl ether disulfonyl chlorides such as 4,4'-phenyletherdisulfonyl chloride; 2,4'-phenyletherdisulfonyl chloride; 4,4'-biphenyletherdisulfonyl chloride; etc., are applicable as are naphthalene and anthracene derivatives such as the following: 1,3-naphthalenedisulfonyl chloride; 2,6-naphthalenedisulfonyl chloride; 1-chloro-2,7-naphthalenedisulfonyl chloride; 1-chloro-3,5-naphthalenedisulfonyl chloride; 1-nitro-3,6-naphthalenedisulfonyl chloride; 2-ethoxy-1,6-naphthalenedisulfonyl chloride; 1,5-anthracenedisulfonyl chloride; 1,8-anthracenedisulfonyl chloride; etc.

Numerous other types of suitable aromatic disulfonyl chlorides will be apparent to those skilled in the art.

The use of two or more diphenols results in copolymer compositions whose properties may be widely varied according to the structure and relative proportions of the diphenols. For example, a relatively stiff molecular chain as obtained with a benzenedisulfonyl chloride and bisphenol-A or 4,4'-dihydroxybiphenyl is made more flexible and, consequently, tougher through copolymerization with a less rigid diphenol such as may be derived from a diaryl ether. The relative proportions of the two or more diphenols may be widely varied such that any one diphenol as typified by Formula I or II may constitute as little as 5 wt. percent or as much as 95 wt. percent of the total diphenol mix.

As an additional embodiment of the present invention, it is to be understood that two or more aromatic disulfonyl halides may be copolymerized with two or more diphenols to yield useful aromatic sulfonate copolymers.

Although the materials of this invention may be prepared by such conventional condensation procedures as direct thermal reaction of the disulfonic acid or disulfonyl halide and the diphenols or by solution polymerization involving the disulfonyl halide and the diphenols in basic organic media, it is preferred to conduct the polycondensation via an interfacial polymerization technique. Generally speaking, the interfacial polycondensation requires relatively pure monomeric reactants, i.e., the aryl disulfonyl halide, most conveniently one of the disulfonyl chlorides, and two or more of the diphenols as herein previously indicated should be relatively pure. Polymerizations may be carried out at or near room temperature by mixing a basic aqueous solution of the alkali metal salt of the two or more diphenols with the disulfonyl chloride contained in an inert organic solvent. The addition of a basic organic catalyst, such as a quaternary ammonium salt or a suitable amine is useful in promoting higher molecular weights. The reaction mixtures are preferably stirred vigorously for varying periods of time and the copolymers precipitated or coagulated by any suitable means as, for example, by addition to a non-solvent such as isopropyl alcohol. The precipitated copolymers are generally washed to remove any residual impurities and dried.

The organic solvent utilized for the disulfonyl chloride may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range, from less than 1 wt. percent to more than 20 wt. percent, being limited at the high concentrations only by the increasing difficulties in handling the extremely viscous media encountered. Polymerization time may be varied from less than five minutes to more than three hours depending upon the reactivity of the copolymer reactants and the molecular weight desired. Extremely short polymerization periods will generally result in lower molecular weight copolymers as compared with longer polymerization times which give higher molecular weights. Although it is preferred to use approximately equimolar quantities of the diphenol mixture and the disulfonyl chloride, the reactivity of the sulfonyl chloride and the reaction conditions are such that the use of exact stoichiometry is not critical to the attainment of relatively high molecular weights. Thus, in fact, block copolymers are readily obtained using incremental reactant addition. The mode of addition of the disulfonyl chloride to the diphenols is governed by the nature of the copolymer desired and it is possible to add incrementally or to batch-mix the reactants if desired. The various diphenols need not be added together but may be added one at a time or as alternate increments, again depending upon the polymer structure sought, i.e., random, random-block, block-block, etc. In addition, it is also possible to invert the order of addition of reactants and add the diphenols to the sulfonyl chloride. The basic organic catalyst also may be added initially, during the course of the polycondensation, or it may be added incrementally during the reaction. Although benzyltrimethylammonium chloride is a particularly effective catalyst, other quaternary salts and suitable amines are effective. The amount of catalyst added may vary from less than 0.01 wt. percent to more than 1.0 wt. percent. Although the polymerization temperature may be varied over a wide range as, for example, from less than 0° C. to more than 100° C., it is most convenient to conduct the reaction at or about room temperature, i.e., 25° C.

It will be seen that the polycondensation of a mixture of diphenols with an aryldisulfonyl chloride will yield a sulfonate copolymer typically represented by unit structure formulas, wherein the various symbols have the same meaning as hereinbefore indicated and where the number of unit structures is dependent upon and equal to the number of different diphenols involved in the copolymer preparation. A copolymer derived from two different diphenols will, therefore, comprise the following unit structures V and VI in the polymer chain:

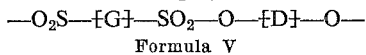

Formula V

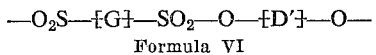

Formula VI where the aromatic carbocyclic groups G, D, and D' are as hereinbefore defined and where D and D' must be different but where G and either D or D' may be the same or different. The order and relative proportions of V and VI may be widely varied as indicated above. It is to be noted that (1) the aromatic carbocyclic groups D and D' are derived from different diphenols and are bonded through aromatic ring carbon atoms directly to sulfonate group oxygen atoms, whereas (2) the aromatic carbocyclic group G is derived from an aromatic disulfonyl halide and is bonded through aromatic ring carbon atoms directly to sulfonate group sulfur atoms.

The following examples are illustrative of the preparation of polysulfonate copolymers from mixed diphenols and a disulfonyl chloride.

EXAMPLE 1

A solution of 5.503 g. (20 mmoles) of 1,3-benzenedisulfonyl chloride in 75 ml. of methylene chloride was added over a 50 minute period at 28–31° C. to a well stirred solution of 2.283 g. (10 mmoles; 50 mole percent) of 2,2-bis(4-hydroxyphenyl)-propane, 3.661 g. (10 mmoles; 50 mole percent) of 2,2-bis(3,5-dichloro-4-hydroxyphenyl)-propane, 41 mmoles of NaOH and 4 drops of a 60% aqueous solution of benzyltrimethylammonium chloride in 75 ml. of water. The resulting mixture was vigorously agitated for three additional hours at the same temperature. The polymer was coagulated by addition of the reaction mixture to a large excess of isopropanol; it was washed with water and isopropanol and dried in vacuo. The copolymer had an intrinsic viscosity, measured in methylene chloride at 20° C., of 0.52 dl./g. and a softening temperature range of 130–168° C.

EXAMPLE 2

A solution of 5.503 g. (20 mmoles) of 1,3-benzenedisulfonyl chloride in 75 ml. of methylene chloride was added with vigorous stirring at 38–39° C. to 2.283 g. (10 mmoles; 50 mole percent) of 2,2-bis(4-hydroxyphenyl)-propane, 3.124 g. (10 mmoles; 50 mole percent) of 2,2-bis(3-isopropyl-4-hydroxyphenyl)-propane, 42 mmoles of NaOH and 4 drops of a 60% aqueous solution of benzyltrimethylammonium chloride in 100 ml. of water. The resulting mixture was then vigorously agitated for an additional 2½ hours. The polymer was isolated as in Example 1. The copolymer had an intrinsic viscosity of 0.35 dl./g. and a softening temperature range of 100–142° C.

EXAMPLE 3

A solution of 7.229 g. (25.0 mmoles) of 2,4-toluenedisulfonyl chloride in 90 ml. of methylene chloride was added over a 10 minute period with vigorous agitation at 27–32° C. to a solution of 2.854 g. (12.5 mmoles; 50 mole percent) of 2,2-bis(4-hydroxyphenyl)-propane, 4.576 g. (12.5 mmoles; 50 mole percent) of 2,2-bis(3,5-dichloro-4-hydroxyphenyl)-propane, 51 mmoles of NaOH and five drops of a 60% aqueous solution of benzyltrimethylammonium chloride in 100 ml. of water. The resulting mixture was agitated for three additional hours. The copolymer was isolated as in Example 1. It had an intrinsic viscosity of 0.79 dl./g. and a softening temperature range of 163–216° C.

EXAMPLE 4

A solution of 7.229 g. (25.0 mmoles) of 2,4-toluenedisulfonyl chloride in 90 ml. of methylene chloride was added over five minutes at 27–32° C. to a well-stirred solution of 4.566 g. (20 mmoles; 80 mole percent) of 2,2-bis(4-hydroxyphenyl)-propane, 1.562 g. (5 mmoles; 20 mole percent) of 2,2-bis(3-isopropyl-4-hydroxyphenyl)-propane, 51 mmoles of NaOH and five drops of a 60% aqueous solution of benzyltrimethylammonium chloride in 110 ml. of water. The reaction mixture was stirred for two additional hours. The polymer was isolated as in Example 1. The copolymer had an intrinsic viscosity of 0.35 dl./g. and a softening temperature range of 146–159° C.

EXAMPLE 5

A solution of 7.229 g. (25 mmoles) of 2,4-toluenedisulfonyl chloride in 90 ml. of methylene chloride was added with stirring at 27–32° C. over a two minute period to a solution of 2.854 g. (12.5 mmoles; 50 mole percent) of 2,2-bis(4-hydroxyphenyl)-propane, 3.715 g. (12.5 mmoles; 50 mole percent) of 2,2-bis(3-chloro-4-hydroxyphenyl)-propane, 51 mmoles of NaOH and five drops of a 60% aqueous solution of benzyltrimethylammonium chloride in 105 ml. of water. The resulting mixture was stirred for two additional hours. The copolymer had an intrinsic viscosity of 1.06 dl./g. and a softening temperature range of 173–196° C.

EXAMPLE 6

A solution of 6.448 g. (22.3 mmoles) of 2,4-toluenedisulfonyl chloride in 90 ml. of methylene chloride was added with vigorous stirring over two minutes at 27–31° C. to a solution of 3.314 g. (11.5 mmoles; 50 mole percent) of 2,2-bis(3-chloro-4-hydroxyphenyl)-propane, 4.082 g. (11.15mmoles; 50 mole percent) of 2,2-bis(3,5-dichloro - 4 - hydroxyphenyl) - propane, 45.6 mmoles of NaOH and five drops of a 60% aqueous solution of benzyltrimethylammonium chloride in 100 ml. of water. The reaction mixture was stirred for four hours. The copolymer was isolated as in Example 1. It had an intrinsic viscosity of 0.84 dl/g. and a softening temperature range of 168–206° C.

EXAMPLE 7

A solution of 8.25 g. (30 mmoles) of 1,3-benzenedisulfonyl chloride in 100 ml. of methylene chloride was added to a solution of 4.79 g. of 2,2-bis(4-hydroxyphenyl)-propane (21 mmoles, 70 mole percent), 1.82 g. (9 mmoles, 30 mole percent) of 4,4'-dihydroxydiphenyl ether, 62.3 mmoles of NaOH and 6 drops of a 60% aqueous solution of benzyltrimethylammonium chloride in 100 ml. of water. The resulting mixture was stirred for four hours and the copolymer isolated as in Example 1. The product had an intrinsic viscosity of 1.07 dl./g. An injection molded bar had a heat distortion temperature of approximately 96° C. A film, cast from methylene chloride, had a tensile strength of 5,000 p.s.i. and ultimate elongation of 14%.

EXAMPLE 8

The experimental conditions were the same as in Example 7 except that 6.16 g. (27 mmoles, 90 mole percent) of 2,2-bis(4-hydroxyphenyl)-propane and 0.61 g. (3 mmoles, 10 mole percent) of 4,4'-dihydroxydiphenyl ether were used. The product had an intrinsic viscosity of 1.28 dl./g. A molded bar of the copolymer had a heat distortion temperature of 105° C. and a glass transition temperature of approximately 96° C.

EXAMPLE 9

The experimental conditions were the same as in Example 7 except that 3.42 g. (15 mmoles, 50 mole percent) of 2,2-bis(4-hydroxyphenyl)-propane and 3.03 g. (15 mmoles, 50 mole percent) of 4,4'-dihydroxydiphenyl ether were used. The product had an intrinsic viscosity of 0.64 dl./g. A film cast from methylene chloride had a tensile strength of 6,500 p.s.i. and an ultimate elongation of 17%.

EXAMPLE 10

The experimental conditions were the same as in Example 7 except that 6.16 g. (27 mmoles, 90 mole percent) of 2,2-bis(4-hydroxyphenyl)-propane and 0.89 g. (3 mmoles, 10 mole percent) of 1,1-bis(3-methyl-4-hydroxyphenyl)-cyclohexane were used. The reaction was carried out at room temperature for four hours. The product had an intrinsic viscosity of 0.86 dl./g. An injection molded bar had a heat distortion temperature of approximately 108° C. and a glass transition temperature of approximately 98° C. A film, cast from methylene chloride, and a tensile strength of 5,600 p.s.i. and an ultimate elongation of 8%.

EXAMPLE 11

A solution of 7.43 g. (27 mmoles, 90 mole percent) of 1,3-benzenedisulfonyl chloride and 0.87 g. (3 mmoles, 10 mole percent) of 2,4-toluenedisulfonyl chloride in 100 ml. of methylene chloride was added rapidly to a solution of 5.82 g. (25.5 mmoles, 85 mole percent) of 2,2-bis(4-hydroxyphenyl)-propane and 0.91 g. (4.5 mmoles, 15 mole percent) of 4,4'-dihydroxyphenyl ether, 62.3 mmoles of NaOH and 6 drops of a 60% aqueous solution of benzyltrimethylammonium chloride in 100 ml. of water. The resulting mixture was vigorously agitated for four hours and the copolymer isolated as in Example 1. The product had an intrinsic viscosity of 0.98 dl./g. A film of this material, cast from methylene chloride, had a tensile strength of 6,000 p.s.i. and an ultimate elongation of 10%.

It will be apparent that the copolymer compositions of this invention are inherently a more versatile and useful class of polyesters than the simple homopolymers and that they possess unique properties which fit them for use in many varied plastics applications. In particular, their stability toward hydrolysis or aminolysis is without precedent in polyester technology. This extreme stability is important in all applications requiring exposure to moisture or humidity at elevated temperatures where retention of physical, electrical and chemical properties is required. The combination of high softening temperature, desirable strength characteristics and thermal and chemical stability make these compositions useful as thermoplastic molding compounds for the fabrication of molded parts, gaskets, tubing, gears, casings, and the like either as virgin resin or combined with such fillers as silica, carbon black, wood flour, and the like. Films are useful as packaging material, containers, covers, liners, electrical insulation, recording tapes, photographic film base, pipe wrappings, etc. Films and fibers may be oriented or drawn at suitable temperatures to permit enhancement of strength properties such as tensile and flexural strengths. Fibers may be readily formed by melt or solution spinning and are useful as yarn, thread, bristle, rope, and the like. The compositions of this invention may be readily pigmented or dyed and suitable stabilizers and plasticizers as are known in the art may be incorporated. Alloying or admixture with other resinous materials may also be readily accomplished. The very desirable combination of properties found in the present compositions make them also useful for surface coatings in paints, varnishes and enamels and their powerful adhesive qualities render them particularly useful as adhesives for plastic, rubber, metal, glass, or wood parts.

It is apparent from the foregoing examples and discussion that many widely different embodiments may be made without departing from the spirit and scope of this invention and it is to be understood that said invention is in no way limited except as set forth in the appended claims.

We claim:

1. A linear polymeric composition having an intrinsic viscosity in excess of 0.3 dl./g. when measured in a solution of methylene chloride at 20° C., and a heat distortion temperature in excess of 96° C., comprising in its linear chain at least two different sulfonate ester structural units selected from the group consisting of:

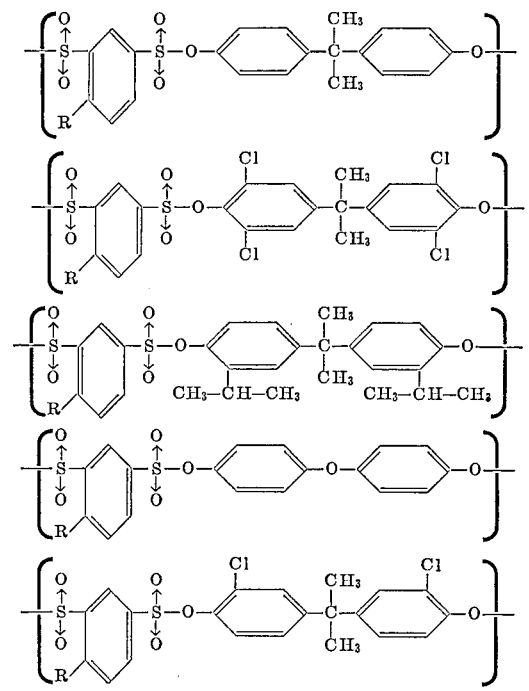

where R is selected from the group consisting of H and $CH_3$, said polymeric composition characterized in that the divalent aromatic radicals attached to the sulfur atoms in the recurring sulfonate ester linkages are the same.

2. The linear polymeric composition of claim 1, said polymer having an intrinsic vicosity in excess of 0.3 dl./g. when measured in a solution of methylene chloride at 20° C. comprising in its linear chain from about 5 mole percent to about 95 mole percent sulfonate ester structural units of the formula

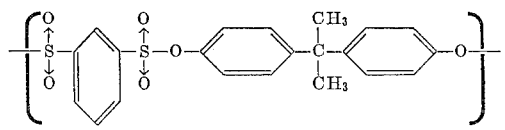

and correspondingly from about 95 mole percent to about 5 mole percent of sulfonate ester structural units of the formula

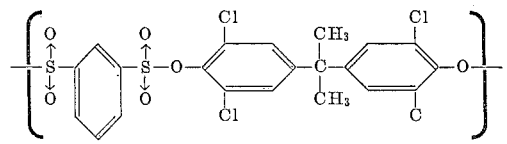

3. The copolymer composition of claim 2 wherein at least one of the structural units recurs in sequence of from about 2 to 100 units to thereby form a block copolymer.

4. The linear polymeric composition of claim 1, said polymer having an intrinsic viscosity in excess of 0.3 dl./g. when measured in a solution of methylene chloride at 20° C. comprising in its linear chain from about 5 mole percent to about 95 mole percent sulfonate ester structural units of the formula

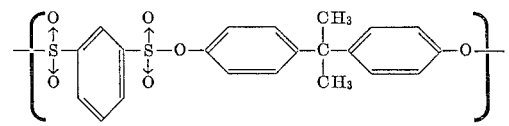

and correspondingly from about 95 mole percent to about 5 mole percent of sulfonate ester structural units of the formula

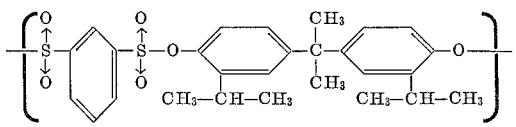

5. The copolymer composition of claim 4 wherein at least one of the structural units recurs in sequence of from about 2 to 100 units to thereby form a block copolymer.

6. The linear polymeric composition of claim 1, said polymer having an intrinsic vicosity in excess of 0.3 dl./g. when measured in a solution of methylene chloride at 20° C. comprising in its linear chain from about 5 mole percent to about 95 mole percent sulfonate ester structural units of the formula

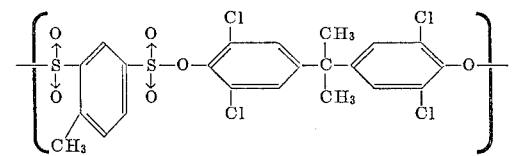

and correspondingly from about 95 mole percent to about 5 mole percent of sulfonate ester structural units of the formula

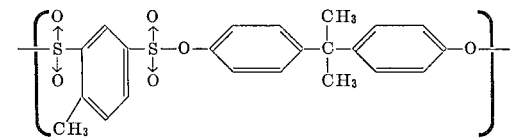

7. The copolymer composition of claim 6 wherein at least one of the structural units recurs in sequence of from about 2 to 100 units to thereby form a block copolymer.

8. The linear polymeric composition of claim 1, said polymer having an intrinsic vicosity in excess of 0.3 dl./g. when measured in a solution of methylene chloride at 20° C. comprising in its linear chain from about 5 mole percent to about 95 mole percent sulfonate ester structural units of the formula

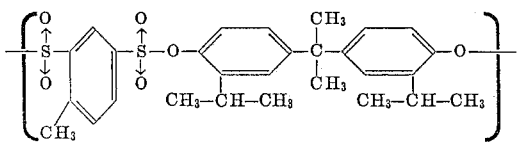

and correspondingly from about 95 mole percent to about 5 mole percent of sulfonate ester structural units of the formula

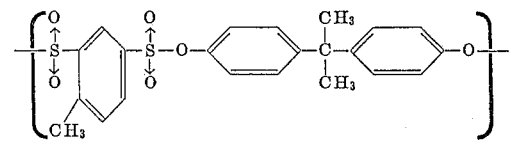

9. The copolymer composition of claim 8 wherein at least one of the structural units recurs in sequence of from about 2 to 100 units to thereby form a block copolymer.

10. The linear polymer composition of claim 1, said polymer having an intrinsic viscosity in excess of 0.3 dl./g. when measured in a solution of methylene chloride at 20° C. comprising in its linear chain from about 5 mole percent to about 95 mole percent sulfonate ester structural units of the formula

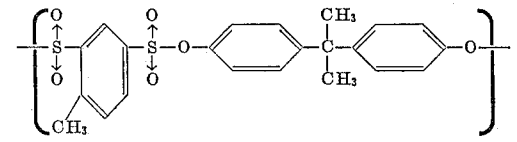

and correspondingly from about 95 mole percent to about 5 mole percent of sulfonate ester structural units of the formula

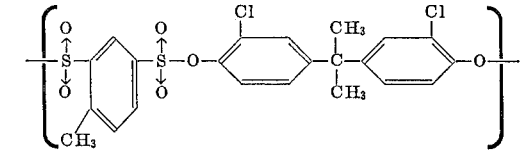

11. The copolymer composition of claim 10 wherein at least one of the structural units recurs in sequence of from about 2 to 100 units to thereby form a block copolymer.

12. The linear polymeric composition of claim 1, said polymer having an intrinsic viscosity in excess of 0.3 dl./g. when measured in a solution of methylene chloride at 20° C. comprising in its linear chain from about 5 mole percent to about 95 mole percent sulfonate ester structural units of the formula

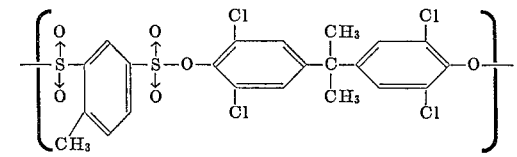

and correspondingly from about 95 mole percent to about 5 mole percent of sulfonate ester structural units of the formula

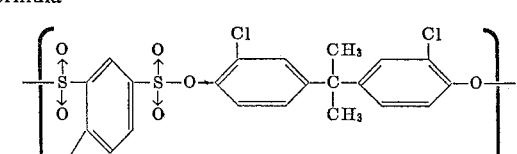

13. The copolymer composition of claim 12 wherein at least one of the structural units recurs in sequence of from about 2 to 100 units to thereby form a block copolymer.

14. The linear polymeric composition of claim 1, said polymer having an intrinsic viscosity in excess of 0.3 dl./g. when measured in a solution of methylene chloride at 20° C. comprising in its linear chain from about 5 mole percent to about 95 mole percent sulfonate ester structural units of the formula

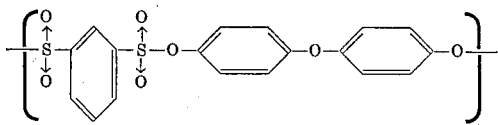

and correspondingly from about 95 mole percent to about 5 mole percent of sulfonate ester structural units of the formula

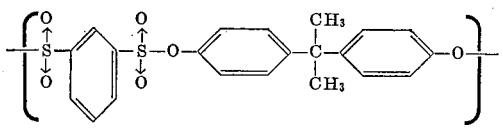

15. The copolymer composition of claim 14 wherein at least one of the structural units recurs in sequence of from about 2 to 100 units to thereby form a block copolymer.

16. The linear polymeric composition of claim 1, said polymer having an intrinsic viscosity in excess of 0.3 dl./g. when measured in a solution of methylene chloride at 20° C. comprising in its linear chain from about 5 mole percent to about 95 mole percent sulfonate ester structural units of the formula

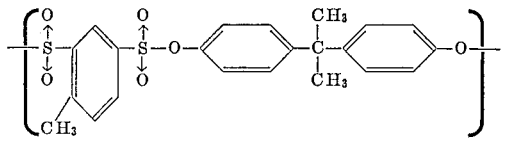

and correspondingly from about 95 mole percent to about 5 mole percent of sulfonate ester structural units of the formula

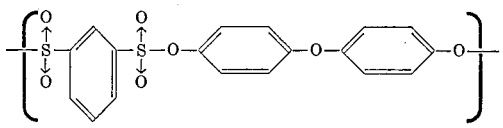

17. The copolymer composition of claim 16 wherein at least one of the structural units recurs in sequence of from about 2 to 100 units to thereby form a block copolymer.

References Cited by the Examiner

UNITED STATES PATENTS

| | | | |
|---|---|---|---|
| 2,035,578 | 3/1936 | Wagner | 260—47 |
| 2,708,617 | 5/1955 | Magat | 260—47 |
| 3,028,364 | 4/1962 | Conix | 260—49 |

FOREIGN PATENTS

| | | |
|---|---|---|
| 565,478 | 3/1958 | Belgium. |
| 585,882 | 6/1960 | Belgium. |

WILLIAM SHORT, *Primary Examiner.*

HAROLD N. BURSTEIN, LOUISE P. QUAST, *Examiners.*

W. G. GOODSON, J. C. MARTIN, *Assistant Examiners.*